(12) United States Patent
Hale (10) Patent No.: US 6,564,725 B2
(45) Date of Patent: May 20, 2003

(54) LOAD SUPPORTING PLATFORM

(76) Inventor: Ronald G. Hale, 2113 Randall, Duncan, OK (US) 73533

( * ) Notice: Subject to any disclaimer, the term of this patent is extended or adjusted under 35 U.S.C. 154(b) by 0 days.

(21) Appl. No.: 09/943,812

(22) Filed: Aug. 31, 2001

(65) Prior Publication Data

US 2002/0088380 A1 Jul. 11, 2002

Related U.S. Application Data

(60) Provisional application No. 60/259,802, filed on Jan. 5, 2001.

(51) Int. Cl.[7] ............................................. B65D 19/38
(52) U.S. Cl. ................................. 108/57.25; 108/56.1
(58) Field of Search ......................... 108/57.25, 51.11, 108/56.1, 56.3, 901, 902

(56) References Cited

U.S. PATENT DOCUMENTS

| | | |
|---|---|---|
| 3,757,704 A | 9/1973 | Allgeyer et al. |
| 4,597,338 A | 7/1986 | Kreeger |
| 5,497,709 A | 3/1996 | Gonzalez et al. |
| 5,579,686 A | 12/1996 | Pigott et al. |
| 5,868,080 A * | 2/1999 | Wyler et al. |
| 5,887,529 A | 3/1999 | John et al. |
| 6,006,677 A | 12/1999 | Apps et al. |
| 6,029,583 A | 2/2000 | LeTrudet |
| 6,109,190 A | 8/2000 | Hale et al. |
| 6,199,488 B1 * | 3/2001 | Favaron et al. |
| 6,250,234 B1 * | 6/2001 | Apps |
| 6,283,044 B1 * | 9/2001 | Apps |
| 6,357,366 B1 * | 3/2002 | Frankenberg |

FOREIGN PATENT DOCUMENTS

DE        4142659 A1 *  6/1983

* cited by examiner

Primary Examiner—Jose V. Chen
(74) Attorney, Agent, or Firm—Thomas R. Weaver (57) ABSTRACT

This disclosure provides an article of manufacture for supporting a load. The article can be employed to store a load under static conditions for an extended period of time, and can also serve as a platform for supporting the stored load while the load is being lifted from one location and transported to and placed in another location. The article is comprised of a plurality of separate planar elements which are releasably, but rigidly, connected each to the other to facilitate transport, assembly, repair and replacement of the parts. In one aspect, the article is comprised of a load contacting component featuring a structural system comprised of ribs located in one of the said planar elements inserted into and stabilized by slots located in another of the said planar elements. In another aspect, the load contacting component can be releasably attached to another of the said planar elements to form a rackable pallet capable of supporting a load in an open rack drive-through storage system.

29 Claims, 6 Drawing Sheets

LOAD SUPPORTING PLATFORM

This application is a provisional application Ser. No. 60/259,802 filed on Jan. 5, 2001.

BACKGROUND OF THE INVENTION

1. Technical Field of the Invention

This invention is an article of manufacture. The invention broadly relates to an article of manufacture useful to support, store and aid in the transport of a load. The invention further relates to a platform that facilitates the storage and support of goods. The invention still further relates to a platform that facilitates the transportation from one location to another of goods supported and stored on the platform. The invention more specifically relates to a pallet.

2. Description of the Prior Art and Problems Solved

Persons involved in the art of material handling, such as manufacturers, shipping agents, warehouse operators, retailers and others, have long relied on platforms for supporting, storing, handling and shipping a wide variety of items, such as natural products and manufactured goods. Such platforms are known to be standard in shape and dimension and are referred to in the art as pallets. In a broad sense, pallets are ordinarily rectangular in shape and consist essentially of a storage deck and a support deck, wherein the storage deck and the support deck are spaced apart by, and rigidly connected to, an open frame. Goods are placed on the storage deck and the support deck is placed on some base, such as the ground, a rack system, as described below, or on some other pallet. The open frame employed to connect the storage deck to, and separate it from, the support deck thereby defines a space having sufficient distance between the decks to enable the insertion of lifting arms or tines into the defined space to facilitate lifting and moving the pallet and the goods stored and supported thereon. Such lifting arms can be those usually associated with pieces of equipment known in the art as forklifts and pallet jacks.

Pallets having goods placed thereon can be, and preferably are, stored in accordance with a method designed to maximize the use of available floor space. The art has, thus, developed a rack system which broadly features facing pairs of vertically extending columns. Each pair of columns is connected by a multiplicity of horizontal, vertically spaced, inwardly extending ledges to produce a vertical frame which resembles a ladder having multiple treads. Each horizontal ledge, i.e., each tread, faces, and is in alignment with, a horizontal ledge which is similarly connected to an opposite pair of vertically extending columns. The aligned horizontal ledges lie in the same horizontal plane. The horizontal separation between facing pairs of columns is substantially equal to or perhaps slightly greater than the width dimension of a pallet to thereby enable a pallet to be positioned between adjacent pairs of facing columns, wherein one edge of the pallet is supported by one of the mentioned inwardly extending ledges and the opposite edge of the pallet is supported by the aligned ledge on the opposite pair of columns. This method of storage has been referred to as open edge rack storage of loaded pallets. The rack system employed in this method has been referred to as an open rack drive-through system and pallets employed in the method have been referred to as rackable pallets.

It is evident that the entire weight of goods stored on a rackable pallet placed in an open rack drive-through system is supported between the two opposite edges of the pallet which are in contact with the mentioned ledges of the rack system. Accordingly, such a pallet must possess strength sufficient to support a substantial weight of goods placed on the storage deck thereof while preventing unacceptable bending or sagging, i.e., deflection, of the pallet between the supported edges.

A pallet is subject to rough handling over its useful life. The pallet must, therefore, possess sufficient flexibility to absorb impact in both cold and hot conditions without becoming brittle which could result in a shortened life.

A pallet not having goods placed thereon must sometimes be manually handled by an individual. Accordingly, the weight of the pallet itself becomes an important consideration from the view point of human labor required to safely handle it. In this regard, current government standards require two people to lift items weighing more than 50 pounds.

In view of the deflection and labor problems expressed above, a pallet to be placed in a standard open rack drive-through system is preferably about 48 inches long and about 40 inches wide. Furthermore, a pallet preferably weighs less than about 50 pounds and is preferably capable of supporting a load of about 2800 pounds while exhibiting minimal deflection at a point intermediate the supported edges thereof while in a standard open rack drive-through system.

In addition to the problems of weight and strength discussed above, a desirable pallet is durable and thus can endure the rigors of use over an extended period of time. Furthermore, a desirable pallet can be easily assembled after delivery to a point of use and can be repaired with spare parts. A desirable pallet can be conveniently cleaned to maintain the pallet in a sanitary condition.

It is, accordingly, clear that important problems involved with pallets include: weight, which is influenced by the quantity and type of material employed in the construction of the pallet; strength, which is influenced by the geometry and type of material employed in the construction of the pallet; flexibility and durability, which is influenced by the type of material employed in the construction of the pallet; cleanliness, which is influenced by the type of material employed in the construction of the pallet; and repairability, which is influenced by the design of the pallet and the relationship of the parts thereof.

The prior art has long experienced the use of wooden pallets. Wooden pallets, while being strong and providing satisfactory deflection properties, are, nevertheless, quite heavy and not easily handled by a single person. The useful life of a hard wood pallet is believed to be limited to a period of about five to eight shipments. Wooden pallets tend to splinter and break over the period of use.

The prior art has long sought to produce pallets which can provide the desirable features mentioned above and which can avoid the undesirable features of wood. Accordingly, Hale et al in U.S. Pat. No. 6,109,190 disclose a two-piece, snap-together, rackable pallet constructed of plastic materials, wherein the pallet can be repaired. Furthermore, the pallet of Hale et al can be constructed of different types of plastic material to meet the differing needs of each of the two pieces included in the pallet.

In addition, LeTrudet (U.S. Pat. No. 6,029,583), Apps et al (U.S. Pat. No. 6,006,677), John et al (U.S. Pat. No. 5,887,529), Pigott et al (U.S. Pat. No. 5,579,686), Gonzales et al (U.S. Pat. No. 5,497,709), and Kreeger (U.S. Pat. No. 4,597,338) each disclose pallets comprised of a plastic upper member attached to a plastic lower member. The essential differences between these patents reside in the mode of separation of the upper member from the lower member and the mode of attachment of the upper member to the lower member.

Thus, LeTrudet features a system wherein protruding legs integral with the lower member are adapted to snap into openings in protruding legs integral with the upper member.

Apps et al feature a system wherein protruding legs integral with the lower member snap fit into recesses in the upper member.

John et al feature an intricate system comprised of a multiplicity of modular components which are interlockably assembled to form a pallet. More specifically, the pallet of John et al comprises an upper member comprised of four interlocking pieces and a lower member comprised of six interlocking rails to form a grid, wherein the upper and lower members are separated by spacing members which interlock with the upper member components and the lower member components.

Pigott et al disclose an intricate system of attaching an upper member to a lower member by a combination of six separate and six integral spacers which operate to connect the respective surfaces by a snap lock method. Pigott et al disclose that the separation between connectors is not uniform for the purpose of minimizing deflection caused by loading.

Gonzales et al disclose a pallet having a locking scheme for snapping an integral part of the upper member to an integral part of the lower member. The respective integral parts are, accordingly, in direct contact and also function to provide space between the upper member and the lower member. In one aspect, Gonzales et al disclose discontinuous vertical ribs extending upwardly from the outside edges of the lower member which are adapted to fit into discontinuous slots extending downwardly from the outside edges of the upper member.

Kreeger discloses a pallet having an upper member which is identical to a lower member. The upper and lower members are connected by parts integral to each member which project vertically from each member. The vertically extending parts contact each other, provide space between the upper member and the lower member and are adapted to form interlocking snap-fit latches.

Allgeyer et al. (U.S. Pat. No. 3,757,704) discloses a pallet consisting of at least two separate pieces of material including an upper plastic piece and a lower plastic piece which are in peripheral contact each with the other. The upper plastic piece and the lower plastic piece are sealed together and can cooperate to enclose a third plastic intermediate piece between the upper piece and the lower piece. In addition, a planar reinforcing piece can be inserted between the upper piece and the intermediate piece to add additional strength to the pallet.

In view of the described problems and desires of the prior art and some attempts made in the prior art to solve those problems and satisfy those desires:

It is an object of this invention to provide a pallet having strength sufficient to permit storage of goods placed on the pallet in an open edge rack storage system.

It is also an object of this invention to provide a pallet which can be shipped in pieces and then easily assembled at the point of delivery.

It is also an object of this invention to provide a pallet which can be repaired with replaceable parts.

It is also an object of this invention to provide a pallet which can be configured to provide variable distances between the upper member of the pallet and the lower member of the pallet.

It is also an object of this invention to provide a pallet having a weight which will permit it to be conveniently handled by one person.

It is also an object of this invention to provide a pallet which is durable and which can be maintained in a sanitary condition.

THE INVENTION

Disclosure of the Invention

This invention is an article of manufacture useful for supporting, storing and transporting a load. The article is comprised of at least two, and can include three, separate planar parts, which enable the article to be repaired by convenient replacement of used and/or worn parts with, for example, new parts. The article of this invention is strong and resists deflection under loading; it is flexible and resists impact and is light in weight.

The article, in one embodiment, is comprised of a planar deck component having a flat surface adapted to contact and support a load during static storage of the load as well as during transport thereof. The deck has strength sufficient to support a load during storage as well as to resist dynamic forces encountered during operations conducted to place the load on, and to remove the load from, the deck and during operations conducted to lift and transport the load. The deck, accordingly, possesses at least two principal properties, one of which is that it is stiff enough to support an imposed load without exhibiting unacceptable deflection, and the second of which is that it is flexible enough, i.e., not brittle, to resist abrasive and impact forces without breaking or cracking. As is more particularly described below, the deck is comprised of a load contacting element, referred to as a tray, and a load support element, referred to as a structural insert, wherein the structural insert is comprised of ribs which are adapted for insertion into slots which are integral parts of the tray.

The article, in a second embodiment, comprises the deck component of the first embodiment removably connected to a support component comprised of a planar base member, a plurality of discrete vertical legs and a plurality of mechanical fasteners. The base member is removably connected to the deck by the mentioned legs and mechanical fasteners. The legs and fasteners not only function to connect the deck to the base, but also operate to separate the deck from the base. Accordingly, the distance between deck and base can be easily varied by using legs of different length.

The article of this invention can be employed in a variety of services which require a load bearing surface, such as in floors and roof decking. However, a preferred use of the article is as a pallet for storing retail goods, such as foodstuffs, in vertical open frameworks, referred to as racks. It is well known that such racks are designed to support a large number of pallets in vertical columns, wherein each pallet in a vertical column is supported on two opposite edges by inwardly extending ledges which are load contacting components of the mentioned frameworks.

The article of manufacture of this invention, when in the pallet configuration, offers a variety of benefits. The pallet can be quickly disassembled for repair and replacement of component parts, including the tray, structural insert, base and legs. The pallet can be shipped in unassembled condition to thereby conserve shipping space, or conversely, to increase the number of units which can be shipped in a given shipping volume. The physical and chemical properties of the pallet as a whole can be manipulated by use of different materials of construction to adjust weight, strength, temperature sensitivity, and abrasive, chemical and flame resistance. The dimensions, geometric shape and the number of the mentioned ribs and slots can vary, depending on pallet size and load requirements.

The above mentioned deck of this invention, as previously alluded to, is comprised of an array of at least two, separate, nested, stacked and aligned planar parts each of which is removable from and replaceable in the array. The first of the at least two planar parts of the deck is the load contacting portion thereof, which is referred to herein as a tray. The second of the at least two planar parts of the deck is the auxiliary support portion thereof, which is referred to herein as a structural insert.

The above mentioned tray consists of an upper, i.e., an exposed, side which is adapted to contact a load, and a lower, i.e., an obvert, side which is adapted to help stiffen the tray and, more importantly, to nestably receive, substantially conceal, protect and provide lateral support to, the elements of the structural insert nested therein. The exposed side of the tray is a flat surface having a plurality of holes formed there through to permit liquid to pass through the deck and to help reduce the weight of the tray without damaging the structural integrity thereof. The obvert side of the tray is substantially comprised of a plurality of continuous linear and curvilinear solid projections, or ridges, which are rigidly attached to and project perpendicularly and downwardly from the obvert side of the tray. The vertical solid ridges help stiffen the tray without adding substantial weight thereto.

The ridges projecting from the obvert side of the tray are connected end-to-end to form a variety of geometric shapes such as triangles, rectangles and circles. Linear ridges which are parallel to a side of the tray are, for convenience, referred to as stringers. Linear ridges which are not parallel to a side of the tray are, for convenience, referred to as ties. Curvilinear ridges are, for convenience, referred to as walls.

The solid ridges on the obvert side of the tray occur in parallel adjacent pairs which cooperate to produce slots there between. The slots can help stiffen the tray, but the principal function of the slots is to slidably receive and protect elements, i.e., ribs, of the structural insert. As further explained below, the principal function of the ribs of the structural insert is to stiffen the deck and to transfer the load placed on the tray to the edges of the deck. The slots thus operate to stabilize the ribs to prevent lateral bending and/or horizontal movement of the ribs to thereby maintain them in the desired operating position which is perpendicular to the plane of the tray.

Slots between adjacent stringers are referred to as stringer slots. Slots between adjacent ties are referred to as tie slots. Slots and openings between adjacent walls and stringers are referred to as wall slots and wall openings.

The cross sections of the stringers and ties and, therefore, of the slots, can form any desired geometric shape, such as rectangular, triangular, circular, "T" or any other shape which provides to the tray a combination of low weight and structural integrity.

The ridges, which, as mentioned, cooperate to form the slots to stabilize the ribs, also operate to protect the ribs from potential damage caused by impact with material handling equipment. In this regard, the material of construction of the ridges is flexible in nature and thus exhibits high impact resistance. The tray is, thus, preferably constructed of a material having chemical and physical properties which feature low weight and resistance to abrasive and impact forces caused by handling equipment as well as the load placed thereon. An example of such a material is a recycled or virgin commodity grade plastic, such as high density polyethylene.

The structural insert consists of an upper, i.e., a nesting, side having elements which are adapted to be slidably, but removably, embedded in the obvert side of the tray, and a lower, i.e. a leg, side having elements adapted for slidable, but removable, axial insertion therein of the mentioned legs of the ground support means to enable connection to the deck of the above mentioned base member.

The mentioned nesting elements of the structural insert are substantially comprised of a plurality of linear and curvilinear ribs. The ribs are rigidly and permanently connected at their ends to solid panel points. The combination of ribs and panel points form an open frame work, i.e., a lattice. Linear ribs which are parallel to a side of the structural insert are, for convenience, referred to as stringer ribs. Linear ribs which are not parallel to a side of the structural insert are, for convenience, referred to as tie ribs. Curvilinear ribs are, for convenience, referred to as wall ribs.

Stringer ribs are adapted for slidable insertion into the mentioned stringer slots. Tie ribs are adapted for slidable insertion into the mentioned tie slots. Wall ribs are adapted for slidable insertion into the mentioned wall slots and wall openings. Each of the ribs of the structural insert is shaped to be completely and snugly imbedded in a corresponding slot. Thus, the length of a rib is equal to the depth of the slot into which it is inserted and the width of a rib is equal to or just slightly less than the width of the slot into which it is inserted. Accordingly, after the ribs of the structural insert are nested in the slots of the tray the underside of the deck thereby produced appears to be regular, i.e., lacks material protrusions, and planar in nature.

The material employed in the construction of the structural insert possesses strength sufficient to resist compressive forces exerted by the load placed on the tray which would cause unacceptable deflection of the deck. The selection of the particular material of construction of the structural insert is, thus, principally influenced by the bending strength or flexural modulus and the modulus of elasticity of the material. Flexural modulus relates to resistance to deflection under load, wherein the higher the flexural modulus the greater the resistance to deflection. In contrast, the modulus of elasticity relates to the ability of a material to return to a pre-stressed shape after the release of applied stress. As the elasticity (the modulus of elasticity) of a material increases the ability of the material to resist abrasion also increases, but the ability of the material to resist deflection (the flexural modulus) decreases. However, as the flexural modulus of a material increases the elasticity of the material decreases. Accordingly, the impact properties of the material decreases and it becomes more brittle and subject to cracking caused by static and impact loading. There, thus, exists a need to balance the two material properties to try to optimize the operational results sought in the deck of this invention. In view of the above, the flexural modulus of the material of construction of the structural insert has a value in the range of from about 400,000 to about 1,500,000, and preferably greater than about 800,000 psi.

Materials thus believed to be useful herein to serve as the structural insert include wood, metal, such as steel, glass filled polypropylene and fiberglass. Such materials are known to resist deflection even when subjected to temperatures of about 260° F. and greater. Glass filled polypropylene is preferred.

It is evident that the structural insert is preferably constructed of a material different from the material employed in the tray. In this regard, the tray material has greater elasticity and, thus, greater impact resistance than the structural insert material, whereas the structural insert material has a higher flexural modulus and, thus, greater bending resistance than the tray material. The deck is, thus, preferably a combination of materials which have been shaped to store, support and transport a load.

The specific geometric and structural features of the deck are disclosed below.

In another embodiment, the deck is removably connected to a base member having an outer side and an inner side. The base, like the tray and structural insert, is planar in nature and, when connected to the deck, is in alignment with the deck. The base and tray can be constructed of the identical material.

The outer side of the base is adapted to contact an exterior support, such as the ground or a rack.

The inner side of the base, upon connection to the deck, is adapted to enable either direct contact with the leg side of the structural insert, or indirect contact with the leg side by means of legs of variable length. The inner side of the base member is adapted to enable slidable insertion of selected parts thereof into the interiors of the legs. In the instance where the base is not in direct contact with the leg side, and, thus, separated from the structural insert by the mentioned legs, the combination of the deck and base is referred to herein as a pallet.

The planar portions of the pallet, that is, the tray, structural insert and base, can be made from any material known in the art, and by any means known in the art. However, the preferred materials are those which can be formed by molding. Accordingly, the mentioned parts are preferably made by any molding process known in the art.

The legs are members intended to resist compressive forces applied along the linear axis of the member. The interiors of the legs are adapted to enable slidable, but removable, axial insertion therein of selected elements of the inner side of the base member. The legs are preferably extruded polyvinyl chloride which are hollow and cylindrical in shape and are fire retardant.

BRIEF DESCRIPTION OF THE DRAWINGS

FIG. 2 is the top plan view of the pallet shown in FIG. 1 and in FIG. 1a. FIG. 2 is also the plan view of the upper (load contacting) side of the tray shown in FIG. 1 and FIG. 1a.

FIG. 3b is identical to FIG. 3.

FIG. 4b is also the bottom plan view of the pallet shown in FIG. 1 and FIG. 1a.

DESCRIPTION OF THE PREFERRED EMBODIMENTS

Referring now to FIGS. 1 to 8, and in particular to FIGS. 1 to 4, pallet 1 is comprised of an array of separate, stacked and aligned planar parts which are removable from and replaceable in the array. The separate parts of the array are broadly comprised of load contacting tray 2 and structural insert 10. Load contacting tray 2 has an upper flat side 13, adapted for contacting a load, and an obvert side 14, adapted for nesting contact with structural insert 10. Structural insert 10 has an upper nesting side 17, adapted for embedding insertion into obvert side 14, and a lower leg side 19. When nesting side 17 is embedded in obvert side 14 the thus formed combination of tray 2 and insert 10 is referred to herein as deck 5.

Figure 1:
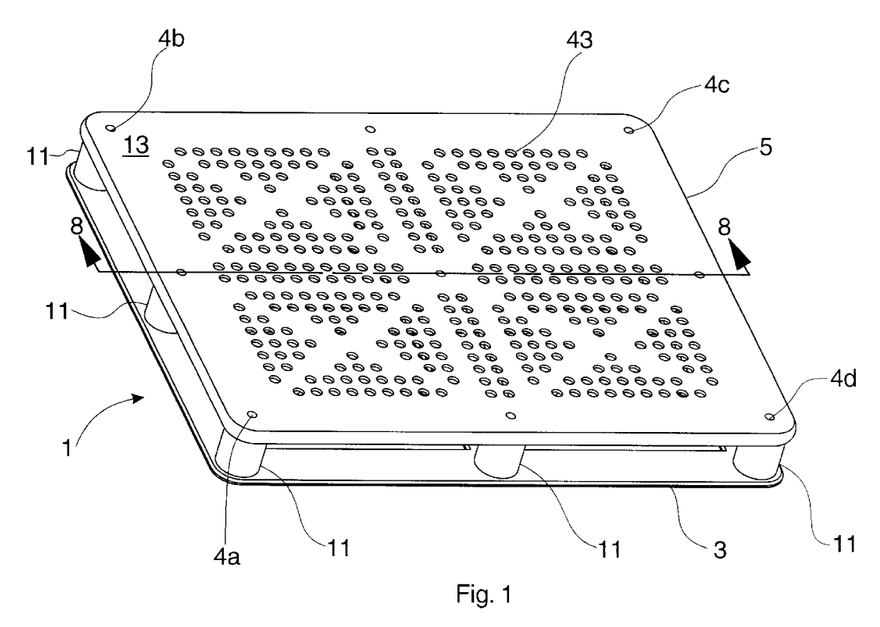
FIG. 1 is a three dimensional view of the fully assembled load bearing article of manufacture of this invention. The embodiment of the article of manufacture shown in FIG. 1 is referred to herein and in the art as a pallet.
Figure 1A:
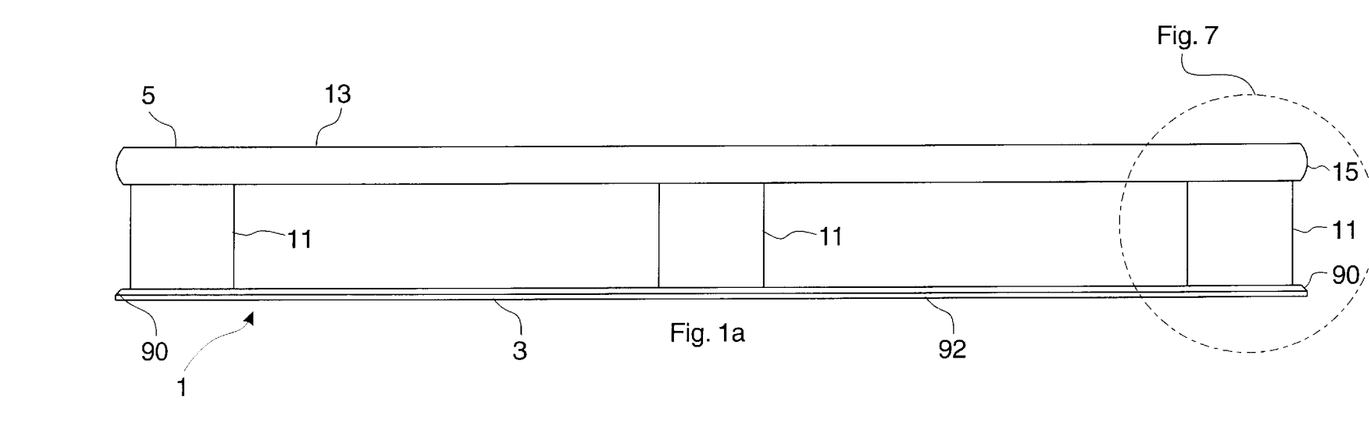
FIG. 1a is the front elevation view of the pallet shown in FIG. 1. For purposes of disclosure of invention, a side elevation of the pallet shown in FIG. 1 is identical in form to the front elevation view.

The array can further comprise base 3 and a plurality of legs 11. The mentioned parts of pallet 1 are rigidly, but removably, connected together by a plurality of suitable fasteners, such as threaded bolts 12. Notice, in the embodiment shown herein, that the number of fasteners 12 employed to assemble pallet 1 is equal to the number of legs 11 employed in pallet 1.

Load contacting tray 2, specifically shown in FIGS. 2, 2a, 2b and 5, is a rectangular planar structure having a uniform, flat, upper face 13 and an irregular obvert face 14. The corners of load contacting tray 2 are preferably rounded. The shape of the rounded corners is dictated by corner radius distances of equal length centered on axis points 4a, 4b, 4c, and 4d. The line passing through axis points 4a and 4d is perpendicular to the line passing through axis points 4a and 4b and the line passing through axis points 4c and 4d. The distance from point 4a to point 4d is equal to the distance from point 4b to point 4c and the distance from point 4a to point 4b is equal to the distance from point 4c to point 4d.

Figure 2:
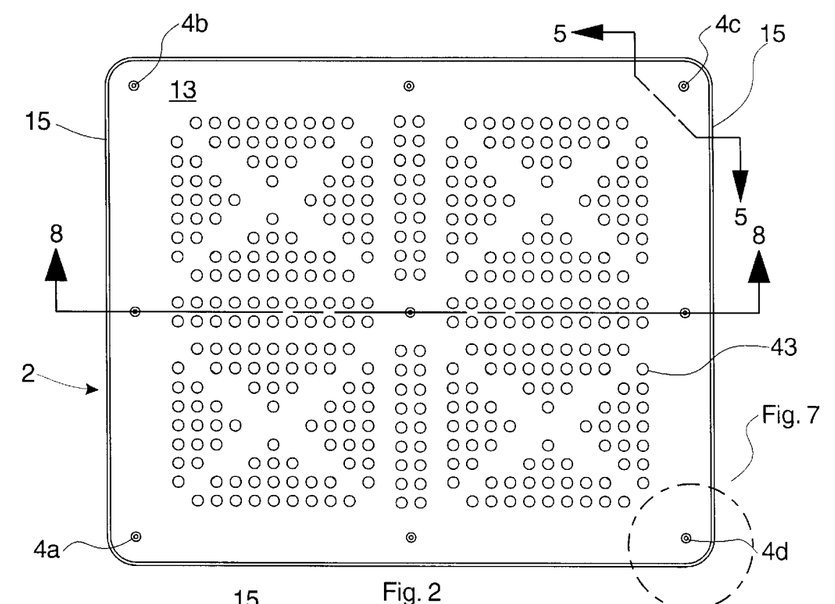
Figure 2A:
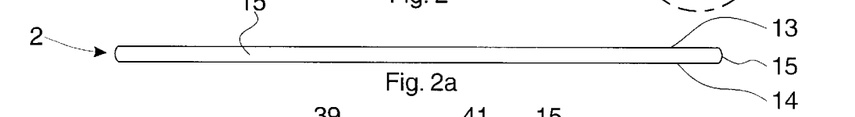
FIG. 2a is the front view of the tray shown in FIG. 2. For purposes of disclosure of invention, a side view of the tray shown in FIG. 2a is identical to the front view.
Figure 2B:
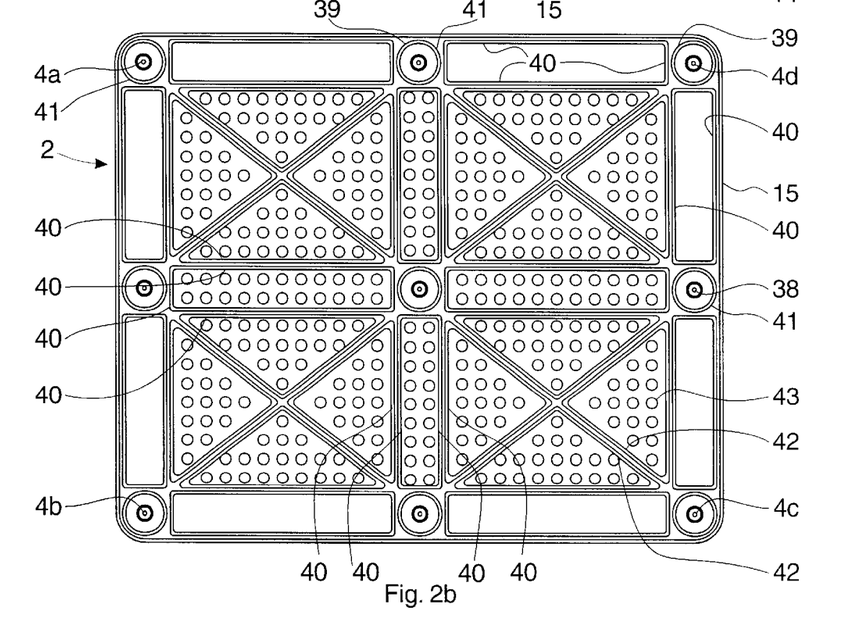
FIG. 2b is the plan view of the bottom (obvert) side of the tray shown in FIG. 2.

Skirt 15 forms a continuous outside edge around the perimeter of load contacting tray 2. Skirt 15 is an extension of face 13 and has a curved exterior face. Skirt 15 is positioned at right angles to face 13 and is rigidly attached thereto. It is clear that skirt 15 is linear between each corner of load contacting tray 2, but curvilinear at each corner of load contacting tray 2. The shape of curvilinear portion of skirt 15 is dictated by each corner radius as previously described.

Face 13 is penetrated by a plurality of holes 43 which are uniformly distributed over face 13. Holes 43 operate to provide open communication to obvert face 14, as well as to the interior of pallet 1. Holes 43 function to decrease the weight of load contacting tray 2 and, therefor, of pallet 1. The surface of face 13 is substantially flat and is adapted to contact a load placed thereon.

Figure 5:
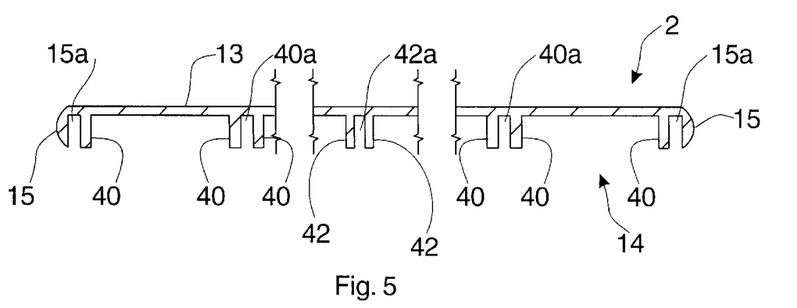
FIG. 5 is a compound cross sectional view of the tray taken in the directions of cut line 5 shown in FIG. 2.
Figure 7:
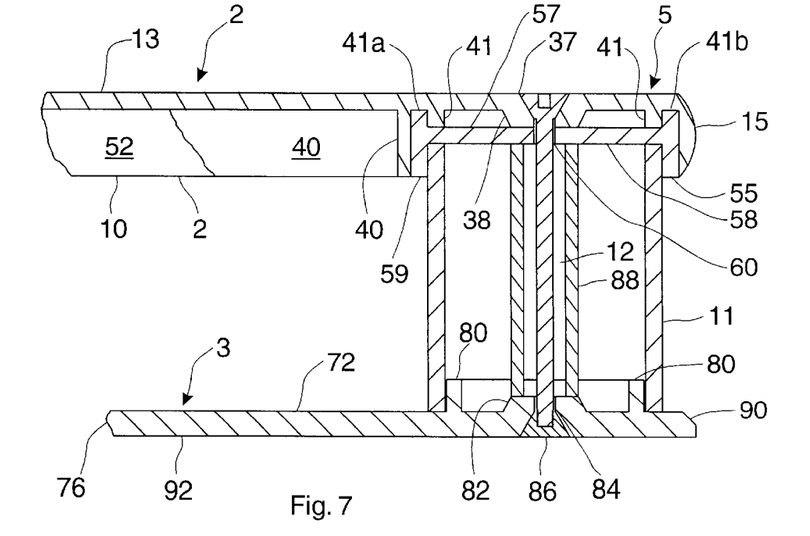
FIG. 7 is an enlarged partial cross sectional view of the circled portion of FIG. 1a and FIG. 2 which is identified by the reference "FIG. 7."

As shown in FIGS. 5 and 7, and more particularly in FIG. 5, the cross section of load contacting tray 2 is not uniform. Thus, face 13 is substantially flat, but obvert face 14, as mentioned, is irregular in shape and features a plurality of ridges 40, 41 and 42 which are rigidly attached to and extend vertically downwardly from face 13 toward the interior of pallet 1. As seen in FIGS. 2b and 5, ridges 40, referred to herein as stringers 40, are rectangular in cross section. Each one of stringers 40 is parallel to an outside edge of load contacting tray 2. Further, as shown in FIG. 2b, ridges 42, referred to herein as ties 42 are also rectangular in cross section. Ties 42 are not parallel to any outside edge of load contacting tray 2. All of stringers 40 and ties 42 are equal in height and width and can function to resist deflection of, and otherwise provide mechanical strength to, load contacting tray 2. Skirt 15 is equal in height to stringers 40 and ties 42 whereby the bottom surfaces of stringers 40, ties 42 and skirt 15 lie in a plane which is parallel to face 13.

Figure 8:
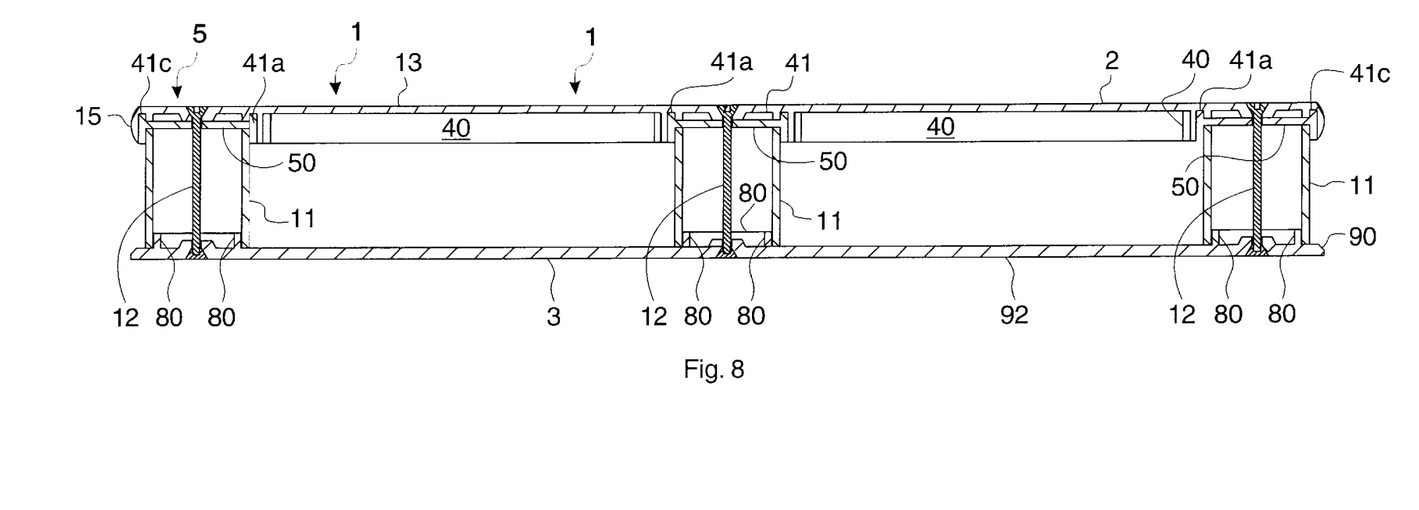
FIG. 8 is a cross sectional view of the article of manufacture of this invention taken in the direction of cut line 8 shown in FIG. 1 and in FIG. 2.

As seen in FIGS. 2b, 7 and 8, ridges 41, referred to herein as walls 41, are, in fact, the walls of rings 39 whose centers are the mentioned axis points 4a, 4b, 4c, and 4d. The radius of each of rings 39, i.e., the ring radius, is less than the previously mentioned corner radius. Accordingly, the difference between the lengths of the corner radius and the radius of rings 39 produces a gap, or slot, which is described herein below as wall slot 41b.

FIG. 7, which clearly shows walls 41, is a partial section through axis point 4d, but the section is typical of a section through any one of axis points 4a, 4b, 4c, and 4d. Thus, with specific reference to FIG. 7, the distance from axis point 4d to the closest approach of wall 41 to stringer 40 is equal to the distance from axis point 4d to the closest approach of wall 41 to skirt 15. The curvilinear slot between wall 41 and skirt 15 has been identified as wall slot 41b. Similarly, the gap thus produced between wall 41 and stringer 40 is described below as wall opening 41a. The height of walls 41 is less than the height of skirt 15, stringers 40 and ties 42. Walls 41 are rectangular in cross section, and preferably have a width equal to the width of stringers 40 and ties 42.

Notice in FIG. 2b that obvert side 14 of load contacting tray 2 is divided into four rectangular quadrants of substantially equal size and that each such quadrant is further divided into four triangles. The base of each triangle is a stringer 40 and each leg of each triangle is a tie 42. The base and legs of each triangle are rigidly connected at the points of intersection. Notice further that each set of four triangles is bounded by a rectangle whose sides consist of stringers 40. The rectangles are also rigidly connected together at the points of intersection. A ring 39, whose curvilinear walls have been defined as walls 41, is positioned at the corner of each of the mentioned four rectangles.

Notice in FIG. 2b and in FIG. 5 that stringers 40 and ties 42 occur in spaced apart adjacent pairs at locations positioned inwardly from skirt 15 of load contacting tray 2. Each such pair cooperate to produce a linear slot between each ridge. In this regard observe FIG. 5 and note stringer slot 40a between each pair of stringers 40 and tie slot 42a between each pair of ties 42. Notice further in FIG. 2b that stringers 40 and skirt 15 also occur in pairs at the outside edges of load contacting tray 2. In this regard observe FIG. 5 and note skirt slot 15a between stringer 40 and skirt 15.

Still further notice in FIGS. 2b, 7 and 8 that a narrow opening is produced at the closest approach between stringer 40 and wall 41. In this regard observe FIG. 7 and note wall opening 41a between stringer 40 and wall 41.

Notice still further that a curvilinear slot is produced between the curvilinear portion of skirt 15 and wall 41 at each corner of load contacting tray 2. In this regard observe FIG. 7 and note wall slot 41b. Wall slot 41b is obviously equal in length to the length of the curvilinear portion of skirt 15 over a 90° arc. Also, as shown in FIG. 8, wall opening 41c is produced at the closest approach between the linear portion of skirt 15 and wall 41.

Skirt 15 is, in reality, a specialized stringer in that one exterior face thereof, as shown in FIG. 5, is curved. Accordingly, the cooperation between skirt 15 and stringer 40 and skirt 15 and wall 41 produce slots. As described, above such slots have been provided the particular designations "skirt slot" and "wall slot."

FIGS. 2b and 7 show a thickened portion of material 38, referred to as a boss, extending downwardly from face 13 from the center of ring 39. A counter sunk hole 37 penetrates face 13 and boss 38 in the center of ring 39. Holes 37, which are located at the corners of the tray 2, are coincident with axes 4a, 4b, 4c and 4d. Walls 41 and boss 38 are equal in height whereby the bottom surfaces of walls 41 and boss 38 lie in the same plane, which is parallel with face 13.

Structural insert 10, as specifically shown in FIGS. 3, 3a, 3b, 7 and 8, is a rectangular planar structure having nesting side 17 and leg side 19. Structural insert 10 is a lattice comprised of a plurality of divided open spaces 18 and 16, a plurality of solid panel points 50, a plurality of stringer ribs 52, a plurality of tie ribs 51, and a plurality of curvilinear stringer ribs 55.

Figure 3:
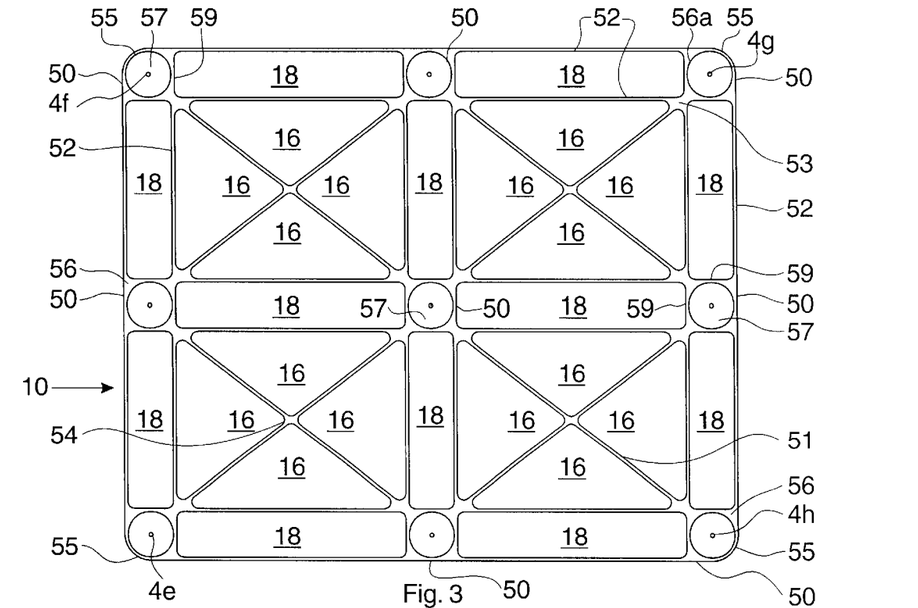
FIG. 3 is the plan view of the upper (nesting) side of the structural insert of the pallet shown in FIG. 1 and FIG. 1a. The nesting side of the structural insert, as shown in FIG. 3, is adapted to be fitted into the obvert side of the tray, as shown in FIG. 2b.
Figure 3A:
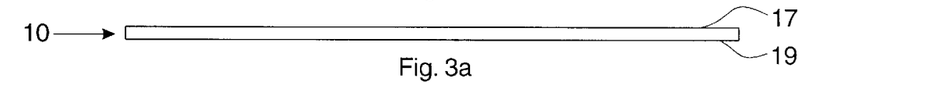
FIG. 3a is the front view of the structural insert shown in FIG. 3. For purposes of disclosure of invention, a side view of the structural insert shown in FIG. 3 is identical to the front view.
Figure 3B:
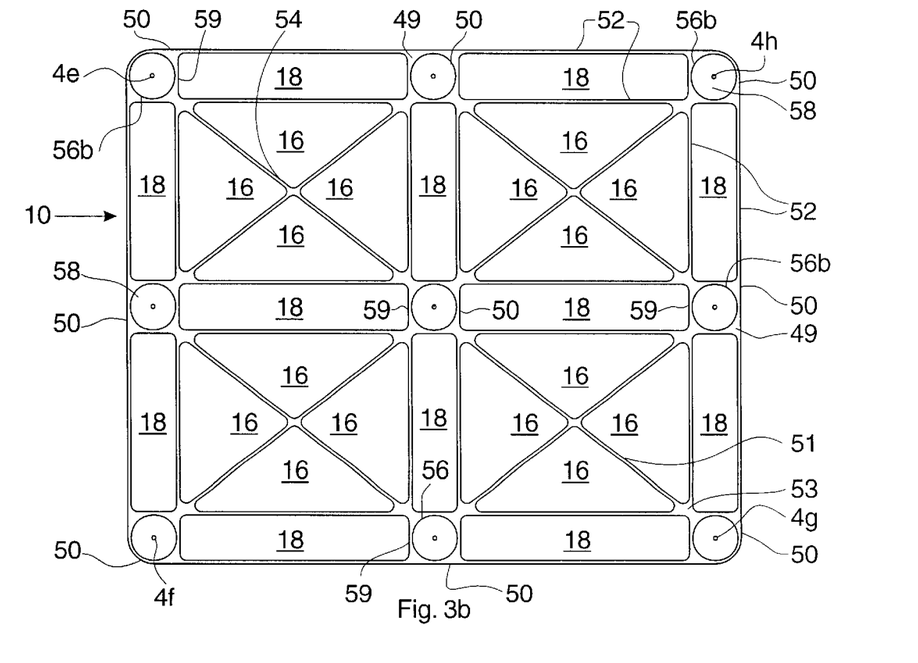
FIG. 3b is the plan view of the lower (leg) side of the structural insert shown in FIG. 3. The nesting side of the structural insert is substantially identical in plan to the leg side of the structural insert. Therefore.

The corners of structural insert 10, as shown in FIGS. 3 and 3b, are preferably rounded. The length of structural insert 10 is less than the length of load contacting tray 2 by an amount equal to double the width of skirt 15. Similarly, the width of structural insert 10 is less than the width of load contacting tray 2 by an amount equal to double the width of skirt 15.

Each one of stringer ribs 52, stringer ribs 55 and tie ribs 51 is a solid having a rectangular cross section and each are equal in height and width. Each stringer rib 52, as seen in FIG. 7, is adapted for complete slidable insertion into an aligned stringer slot 40a or, as suggested in FIG. 5, an aligned skirt slot 15a. Accordingly, the width of each stringer rib 52 is equal to or, slightly less than, the width of each stringer slot 40a and each skirt slot 15a, and the length of each stringer rib 52 is equal to the depth of each stringer slot 40a and each skirt slot 15a. Similarly, each tie rib 51 is rectangular in cross section and the height of each tie rib 51 is equal to the height of each tie slot 42a and is equal to or, slightly less than, the width of each tie slot 42a. Accordingly, each tie rib 51 is adapted for complete slidable insertion into each tie slot 42a. Furthermore, each curvilinear rib 55 is adapted for complete slidable insertion into each wall slot 41b. Likewise, the portions of solid panel points 50 of structural insert 10 which are in alignment with wall openings 41a and 41c are adapted for slidable insertion into such openings.

The ability of the pallet of this invention to resist deflection caused by a load placed on face 13 of tray 2 is believed to be principally provided by the height of stringer ribs 52, stringer ribs 55 and tie ribs 51 in combination with the material employed to make structural insert 10. It is believed that the thickness of such ribs is of considerably lesser importance so long as the slots into which the ribs are inserted operate to maintain the ribs in a position perpendicular to the face 13. The height of the ribs is in the range of from about 1.0 to about 1.5 inches depending upon the flexural modulus of the material.

Stringer ribs 52 and tie ribs 51 are rigidly connected to panel points 50 at junctions 49 and 53. The thickness of panel points 50 at junctions 49 and 53 is equal the height of each one of stringer ribs 52 and 55 and tie ribs 51. The thickness of each panel point 50, however, is reduced within the portion of panel point 50 defined by circular cavity 56 formed in each of the previously mentioned nesting sides 17 and leg sides 19. As mentioned, nesting side 17 is adapted for embedding contact with the obvert side 14 of load contacting tray 2. The function of leg side 19 is described below.

Circular cavities 56 are defined by radials measured from axis points 4e, 4f, 4g and 4h which are in alignment with previously mentioned axis points 4a, 4b, 4c, and 4d, respectively. Holes 60 penetrate panel points 50 in the center of each cavity 56 in alignment with holes 37 of rings 39. Each radial employed to generate cavity 56 is greater in length than the previously mentioned radial employed to generate ring 39, but less in length than the previously mentioned corner radius. Circular cavity 56 on nesting side 17 is more particularly referred to as nesting cavity 56a. The depth of nesting cavity 56a to bottom surface 57 from the upper surface of panel point 50 is equal to the height of wall 41 and boss 38. Circular cavity 56 on leg side 19 is more particularly referred to as leg positioning cavity 56b. It is preferred that the depth of leg positioning cavity 56b to bottom surface 58 from the lower surface of panel point 50 is greater than the depth of nesting cavity 56a as shown in FIG. 7.

The distance between stringer rib 52 and the edge of circular cavity 56 is a minimum at the closest approach of the edge of circular cavity 56 to stringer rib 52. This distance is shown in FIG. 7 and is referred to herein as neck 59. Neck 59 is rectangular in cross section and is equal in width to or slightly less than the width of wall opening 41a. Accordingly, each neck 59 is adapted for complete slidable insertion into a wall opening 41a. The height of neck 59 is equal to the height of stringer rib 52.

Stringer ribs 52 and tie ribs 51 are rigidly connected each to the other at junctions 53 located on panel points 50. Junctions 53, as shown in FIGS. 3 and 3b. are spaced inwardly from the exterior edges of structural insert 10. It is clear that one such junction per panel point occurs at each corner of structural insert 10, that two occur at panel points intermediate the corners along the edges of structural insert 10 and that four such junctions occur at all other panel points of structural insert 10. Tie ribs 52 are rigidly connected each to the other at each intersection of tie ribs such as intersection 54 shown in FIGS. 3 and 3b.

Figure 4:
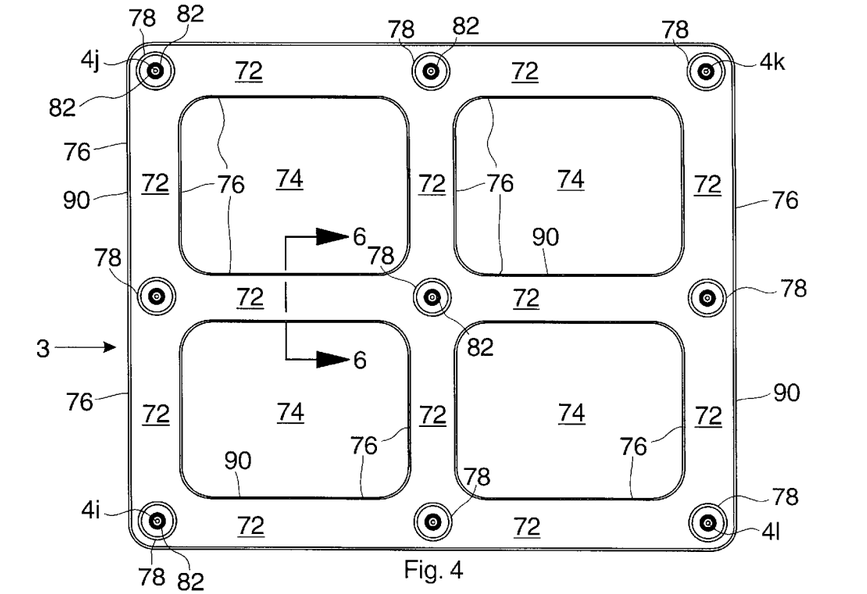
FIG. 4 is the top plan view of the base of the pallet shown in FIG. 1 and in FIG. 1a. The top of the base, shown in FIG. 4, is adapted to enable substantial rigid connection of the base to the deck of the pallet.
Figures 4A, 4B:
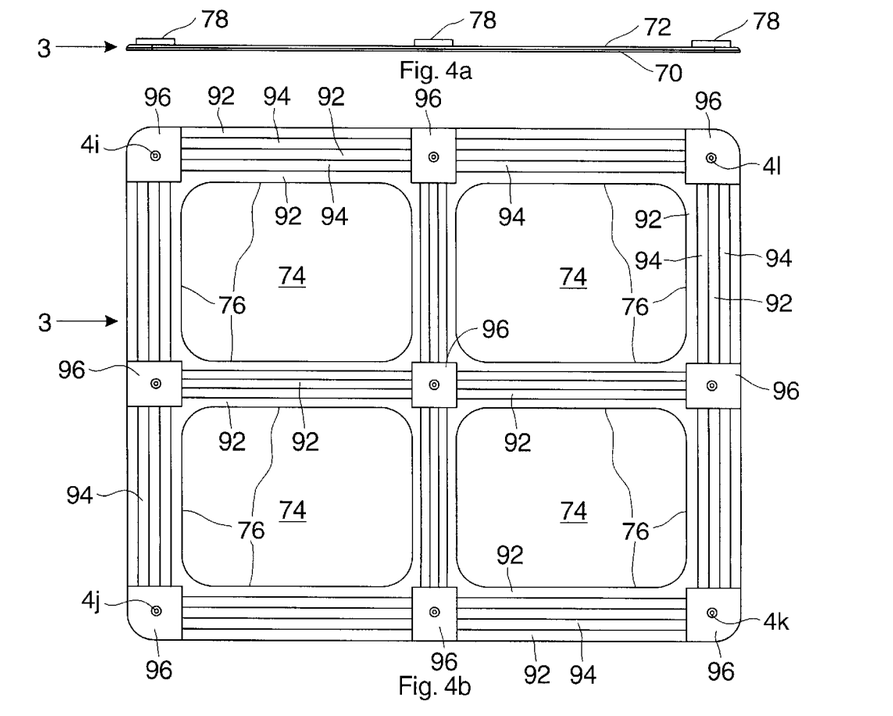
FIG. 4a is the front view of the base shown in FIG. 4. For purposes of disclosure of invention, a side view of the base shown in FIG. 4 is identical to the front view.
FIG. 4b is the bottom plan view of the base shown in FIG. 4.

Base 3, as specifically shown in FIGS. 4, 4a, 4b and 6, is a rectangular structure having outer side 70, adapted to contact an exterior support, such as the ground or a rack, and inner surface 72 adapted to enable either direct contact with leg side 19 of structural insert 10, or indirect contact with leg side 19 by means of legs 11. Base 3 is a lattice comprised of a plurality of divided open spaces 74, which are surrounded by frame members 76. The corners of base 3, as shown in FIGS. 4 and 4b, are preferably rounded. The length of base 3 is substantially equal to the length of load contacting tray 2. Similarly, the width of base 3 is substantially equal to the width of load contacting tray 2.

The shape of the rounded corners of base 3 is dictated by corner radius distances of equal length centered on axis points 4i, 4j, 4k, and 4l which are in alignment with axis points 4a, 4b, 4c, and 4d, respectively, of tray 2. The corner radius of base 3 is identical to the corner radius of tray 2.

Figure 6:
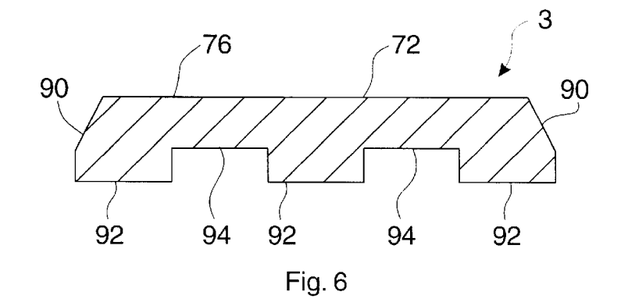
FIG. 6 is a cross sectional view of the base taken in the direction of cut line 6 shown in FIG. 4.

The inner surface 72 of frame members 76, as shown in FIG. 6, is substantially flat. However, as shown in FIGS. 4, 7 and 8, walls 80 of rings 78 extend vertically upwardly from, and are rigidly attached to, surface 72. Rings 78 are positioned at the corners of base 3 and at positions horizontally, vertically and diagonally intermediate such corners.

Rings 78 are centered on axis points 4i, 4j, 4k, and 4l at the corners and at axis points at the mentioned intermediate positions. The radius of each ring 78 is less than the radius of cavities 56 of structural insert 10. The height of walls 80 is equal to the depth of cavity 56b of insert 10. In this regard, upon attachment of base 3 to deck 5 in the embodiment wherein base 3 is in direct contact with leg side 19 of structural insert 10, the top surface of walls 80 contact surface 58 of cavity 56b, and surface 72 of frame members 76 contact the bottom surfaces of stringers 40 of tray 2 and stringer ribs 52 and 55 of insert 10.

As seen in FIG. 7, leg 11 extends between surface 58 of cavity 56b and surface 72 of frame member 76. Leg 11 is a hollow cylinder or tube, the radius of which is greater than the radius of ring 78, but less than the radius of cavity 56b. Wall 80 of ring 78 is, thus, slidably inserted into the interior of one end of leg 11 while the opposite end of leg 11 is slidably inserted into cavity 56b. Leg 11, thus, functions to align and stabilize the alignment of base 3 and deck 5 and to regulate the separation between surface 72 and leg side 19 of structural insert 10. Leg 11 functions as a spacer/stabilizer ring between the exterior surface of walls 80 and the wall of cavity 56b in the specific embodiment wherein surface 72 directly contacts the mentioned elements of tray 2 and insert 10. In this embodiment, it is clear that the minimum height of leg 11 is equal to the height of walls 80.

There is no known maximum height of legs 11. However, when the article of this invention is to be used as a pallet, then the minimum clearance between the bottom of the deck and the top surface of the base is preferably about 3.5 inches.

FIGS. 4 and 7 show a thickened portion of material 82, referred to as a boss, extending upwardly from surface 72 from the center of ring 78. A counter sunk hole 84 penetrates frame 76 and boss 82 in the center of ring 78. Holes 84, which are located at the corners of base 3, are coincident with axes 4i, 4j, 4k and 4l at each corner of base 3. It is understood that every boss 82 is also penetrated by holes 84 which are in alignment with holes in insert 10 and tray 2. Walls 80 and boss 82 are not equal in height. The height of wall 80 is greater than the height of boss 82.

Base 3 can be made from the same material used to make tray 2.

Bolt 12 extends from hole 37 in tray 2 to hole 84 in frame member 76 and passes in route through hole 60 in insert 10. Nut 86 is threaded on bolt 12 as shown in FIG. 7 and tightened sufficiently thereon to securely, but removably, attach base 3 to deck 5 and to maintain insert 10 securely embedded in tray 2.

As shown in FIG. 7, in an alternative procedure for attaching deck 5 to base 3, bolt 12 can be slidably inserted into the hollow interior of spacer 88, a hollow tubular member, positioned between the upper surface of boss 82 and surface 58 of cavity 56b. Upon tightening nut 86 on bolt 12, spacer 88 can dampen excessive bending forces placed on frame member 76 and insert 10 caused by tension developed in bolt 12.

As shown in FIGS. 1a, 4, 6, 7 and 8 all of the edges of frame members 76 are equipped with bevel 90. Bevel 90 functions to more easily permit the wheels of a fork lift to roll over frame member 76 while lifting a loaded pallet as is well known in the art.

As shown in FIGS. 4b and 6, outer side 70 of frame members 76 are equipped with linearly extending feet 92 which are parallel to the edges of base 3. Feet 92 are separated by grooves 94 formed in frame members 76. The intersections of frame members 76 at each corner of base 3 and intermediate such corners as shown in FIG. 4b are not equipped with either feet 92 or grooves 94, but are, instead, flat surfaces 96. Notice that holes 84, mentioned above, penetrate frame members 76 in the center of surfaces 96. Feet 92 and surfaces 96 function to help a loaded pallet to move along tracks equipped with rollers or skate wheels as is well known in the art.

Having described the invention, that which is claimed is:

1. An article of manufacture for supporting a load,
said article being comprised of a deck component consisting essentially of an array of separate, stacked and aligned planar parts, said parts being comprised of two distinct elements removably joined together to form said deck,
wherein said two distinct elements are comprised of a tray and a structural insert, said tray having an exposed side, adapted for contacting said load, and an obvert side, adapted for nesting contact with said structural insert, and said structural insert comprising a nesting side, adapted for embedding contact with said obvert side of said tray.

2. The article of claim 1 wherein said obvert side of said tray is comprised of a plurality of continuous ridges which are rigidly attached to and project perpendicularly and downwardly from said obvert side of said tray, wherein said ridges occur in adjacent pairs which cooperate to produce slots there between, and wherein said nesting side of said structural insert is comprised of a plurality of ribs aligned with and adapted for insertion into said slots to thereby form said deck.

3. The article of claim 2 wherein said structural insert is further comprised of a leg side adapted for contact with a support component.

4. The article of claim 3 wherein said support component is in alignment with and removably attached to said deck,
said support component being comprised of a planar base member, having an outer side and an inner side, a plurality of legs and a plurality of mechanical fasteners,
wherein said inner side of said base member include integral selected means adapted for removable axial insertion into said legs, and
said legs are adapted for removable axial insertion into integral selected means in said leg side of said structural insert.

5. The article of claim 2 wherein the material of construction of said tray is not the same as the material of construction of said structural insert and, further, wherein the flexural modulus of the material of construction of said structural insert is greater than the flexural modulus of the material of construction of said tray.

6. The article of claim 5 wherein the flexural modulus of the material of construction of said structural insert is an amount in the range of from about 400,000 to about 1,500,000 psi.

7. The article of claim 6 wherein the height of said ribs is in the range of from about 1.0 to about 1.5 inches.

8. The article of claim 7 wherein said ridges projecting from said obvert side of said tray are connected end-to-end to form a variety of geometric shapes selected from triangles, rectangles and circles.

9. The article of claim 2 wherein the material of construction of said tray is selected from recycled and virgin commodity grade plastic and the material of construction of said structural insert is selected from wood, steel, glass filled polypropylene and fiberglass.

10. The article of claim 1 wherein the material of construction of said tray is not the same as the material of construction of said structural insert and, further, wherein the flexural modulus of the material of construction of said structural insert is greater than the flexural modulus of the material of construction of said tray.

11. The article of claim 10 wherein the flexural modulus of the material of construction of said structural insert is an amount in the range of from about 400,000 to about 1,500,000 psi.

12. The article of claim 1 wherein the material of construction of said tray is selected from recycled and virgin commodity grade plastic and the material of construction of said structural insert is selected from wood, steel, glass filled polypropylene and fiberglass.

13. An article of manufacture for supporting a load:
said article being comprised of a deck component and a support component in alignment with and removably attached to said deck component;
said deck component consisting essentially of an array of separate, stacked and aligned planar parts, said parts being comprised of at least two distinct elements removably joined together to form said deck,
wherein said at least two distinct elements are comprised of a tray and a structural insert, said tray having an exposed side, adapted for contacting said load, and an obvert side comprised of a plurality of continuous ridges which are rigidly attached to and project perpendicularly and downwardly from said obvert side of said tray, said ridges occurring in adjacent pairs which cooperate to produce slots there between, to thereby adapt said tray for nesting contact with said structural insert, and said structural insert comprising a leg side adapted for contact with said support component and a nesting side comprised of a plurality of ribs aligned with and adapted for insertion into said slots to thereby form said deck;
said support component being comprised of a planar base member, having an outer side and an inner side, a plurality of legs and a plurality of mechanical fasteners, wherein said inner side of said base member includes integral selected means adapted for removable axial insertion into said legs, and said legs are adapted for removable axial insertion into integral selected means in said leg side of said structural insert.

14. The article of claim 13 wherein the material of construction of said tray is not the same as the material of construction of said structural insert and, further, wherein the flexural modulus of the material of construction of said structural insert is greater than the flexural modulus of the material of construction of said tray.

15. The article of claim 14 wherein the flexural modulus of the material of construction of said structural insert is an amount in the range of from about 400,000 to about 1,500,000 psi.

16. The article of claim 15 wherein the height of said ribs is in the range of from about 1.0 to about 1.5 inches.

17. The article of claim 16 wherein said ridges projecting from said obvert side of said tray are connected end-to-end to form a variety of geometric shapes selected from triangles, rectangles and circles.

18. The article of claim 13 wherein the material of construction of said tray is selected from recycled and virgin commodity grade plastic and the material of construction of said structural insert is selected from wood, steel, glass filled polypropylene and fiberglass.

19. An article of manufacture for supporting a load,
said article being comprised of a deck component consisting of an array of separate, stacked and aligned planar parts, said parts being comprised of a tray and a structural insert, said tray and said structural insert being removably joined together to form said deck,
wherein said tray has an exposed side, adapted for contacting said load, and an obvert side, adapted for nesting contact with said structural insert, and
said structural insert having a nesting side, adapted for embedding in said obvert side of said tray;
wherein said obvert side of said tray is comprised of a plurality of continuous ridges which are rigidly attached to and project perpendicularly and downwardly from said obvert side of said tray, said ridges occur in adjacent pairs which cooperate to produce slots there between, and further
wherein said nesting side of said structural insert is comprised of a plurality of ribs aligned with and adapted for slidable, but removable, insertion into said slots to thereby form said deck.

20. The article of claim 19 wherein said structural insert is further comprised of a leg side adapted for removable attachment to a support component.

21. The article of claim 20 wherein said support component is in alignment with, and removably attached to, said deck,
said support component being comprised of a planar base member, having an outer side and an inner side, a plurality of legs and a plurality of mechanical fasteners,
wherein said inner side of said base member include integral selected means adapted for removable axial insertion into said legs, and
said legs are adapted for removable axial insertion into integral selected means in said leg side of said structural insert.

22. The article of claim 21 wherein the material of construction of said tray is selected from recycled and virgin commodity grade plastic and the material of construction of said structural insert is selected from wood, steel, glass filled polypropylene and fiberglass.

23. The article of claim 22 wherein the material of construction of said tray is not the same as the material of construction of said structural insert and, further, wherein the flexural modulus of the material of construction of said structural insert is greater than the flexural modulus of the material of construction of said tray.

24. The article of claim 23 wherein the flexural modulus of the material of construction of said structural insert is an amount in the range of from about 400,000 to about 1,500,000 psi.

25. The article of claim 19 wherein the material of construction of said tray is not the same as the material of construction of said structural insert and, further, wherein the flexural modulus of the material of construction of said structural insert is greater than the flexural modulus of the material of construction of said tray.

26. The article of claim 25 wherein said flexural modulus of the material of construction of said structural insert is an amount in the range of from about 400,000 to about 1,500,000 psi.

27. The article of claim 26 wherein the material of construction of said tray is selected from recycled and virgin commodity grade plastic and the material of construction of said structural insert is selected from wood, steel, glass filled polypropylene and fiberglass.

28. The article of claim 19 wherein the height of said ribs is in the range of from about 1.0 to about 1.5 inches.

29. The article of claim 19 wherein said ridges projecting from said obvert side of said tray are connected end-to-end to form a variety of geometric shapes selected from triangles, rectangles and circles.

* * * * *